United States Patent [19]

Hammer

[11] Patent Number: 5,679,102
[45] Date of Patent: Oct. 21, 1997

[54] EXERCISE EQUIPMENT WITH INTEGRATED BODY WEIGHT SCALE

[75] Inventor: Hans Günter Hammer, Neu-Ulm, Germany

[73] Assignee: Hammer Sport Vertriebs-GmbH, Germany

[21] Appl. No.: 544,948

[22] Filed: Oct. 18, 1995

[30] Foreign Application Priority Data

Feb. 2, 1995 [DE] Germany ............ 295 01 619 U

[51] Int. Cl.$^6$ ............................................. A63B 23/00
[52] U.S. Cl. ................................. 482/57; 482/901
[58] Field of Search ........................ 482/51, 57, 53, 482/52, 901, 148; 73/379

[56] References Cited

U.S. PATENT DOCUMENTS

| | | | |
|---|---|---|---|
| 4,957,286 | 9/1990 | Persons, II et al. | 482/57 |
| 5,466,200 | 11/1995 | Ulrich et al. | 482/901 |
| 5,492,514 | 2/1996 | Daum | 482/57 |
| 5,499,417 | 3/1996 | Wang | 482/53 |

FOREIGN PATENT DOCUMENTS

| | | |
|---|---|---|
| 35 02 127 | 7/1986 | Germany . |
| 37 33 961 | 4/1989 | Germany . |
| 8915981 U | 11/1992 | Germany . |
| 41 41 109 | 6/1993 | Germany . |
| G 94 16 287.5 | 1/1995 | Germany . |

*Primary Examiner*—Stephen R. Crow
*Attorney, Agent, or Firm*—Kenyon & Kenyon

[57] ABSTRACT

An apparatus includes a piece of exercise equipment, one or more weighing cells, and a data interpreter for determining a weight of a person exercising on the exercise equipment. The determined weight is then displayed. The weighing cells may, for example, be mounted to the saddle post or to one or more legs of the exercise equipment.

11 Claims, 5 Drawing Sheets

EXERCISE EQUIPMENT WITH INTEGRATED BODY WEIGHT SCALE

BACKGROUND OF THE INVENTION

Fitness equipment serves its user as a source of exercise for improved maneuverability, muscle building and cardiovascular activity. Good physical condition and a healthy cardio-vascular system are directly related and dependent on the so-called applicable body weight. Therefore, it is necessary to regularly monitor and control body weight.

Exercise equipment such as an (indoor) exercise bike, stepper or rowing machine—if used intensively—will create a loss of body weight. Equipment such as the above-mentioned are commonly equipped with computers that display pertinent information such as time, speed, distance, calorie consumption, pulse, number of steps, etc. Until now, the possibility of showing and monitoring the individual's body weight was non-existent.

SUMMARY OF THE INVENTION

The present invention has the ability to measure, monitor and display an individual's body weight during the use of exercise equipment resting on standing legs such as an indoor exercise bike, stepper or rowing machine.

Consequently, one embodiment of the present invention involves designing the standing legs as, at a minimum, three, preferably four, mechanical or electric weighing cells, or the standing legs may contain such weighing cells. Furthermore, the electric data received from all of the weighing cells is transported via a cable to a joint data interpreter with a connected analog or digital data display.

Due to the weak electrical current supplied from weighing cells, the cable connections from the measurement points to the data interpreter may be firmly soldered in order to ensure the accurate evaluation of data. To fulfill this condition, such exercise items with weighing equipment ideally should have standing legs premounted by the manufacturer. Because exercise equipment usually is very voluminous, the size of the packing cartons may be reduced by making the standing legs foldable. For this purpose, such standing legs are attached to the exercise equipment by a screw bolt serving as an axis or a turning hinge. Prior to putting the exercise equipment into a carton, the standing legs therefore will be folded.

In another embodiment of the present invention, one or more weighing cells are integrated into the saddle (seat) post of an indoor exercise bike.

The weighing cells used for this purpose may include two co-axial positioned parts being spring-suspended against each other by a rubber cushion and a wire strain gauge holding a latch of one part. Such or similar weighing cells fulfill all such requirements. An exemplary weighing cell is commercially available (as series number 2600.02) from Soehnle-Waagen GmbH of Murrhardt, Germany, for example. It is to be understood, however, that other weighing cells, including mechanical weighing cells, can also be utilized in the apparatus according to the present invention.

The display of weight data via one computer board attached to or integrated into the fitness equipment is produced either in a central computer of the exercise equipment or in a display unit independently attached to the exercise equipment. The connection between the data interpreter for all weighing cells and the display unit is produced suitably via a cable; but the connection may also be produced wirelessly via a standard infrared transmission. In this case, the infrared transmitter must be directed by the data interpreter.

Training equipment fitted according to the principles of the present invention allows the exercising person to measure and monitor his/her body weight while (simultaneously) exercising, thereby creating the ability to compare prior findings with current standings. This will place the emphasis on weight loss and weight control between training sessions as opposed to weight loss during the session, because the first noticeable loss is that of water due to perspiration. In any case, the present invention will allow the individual to compare body weight each time prior to training.

DETAILED DESCRIPTION

Figure 1:
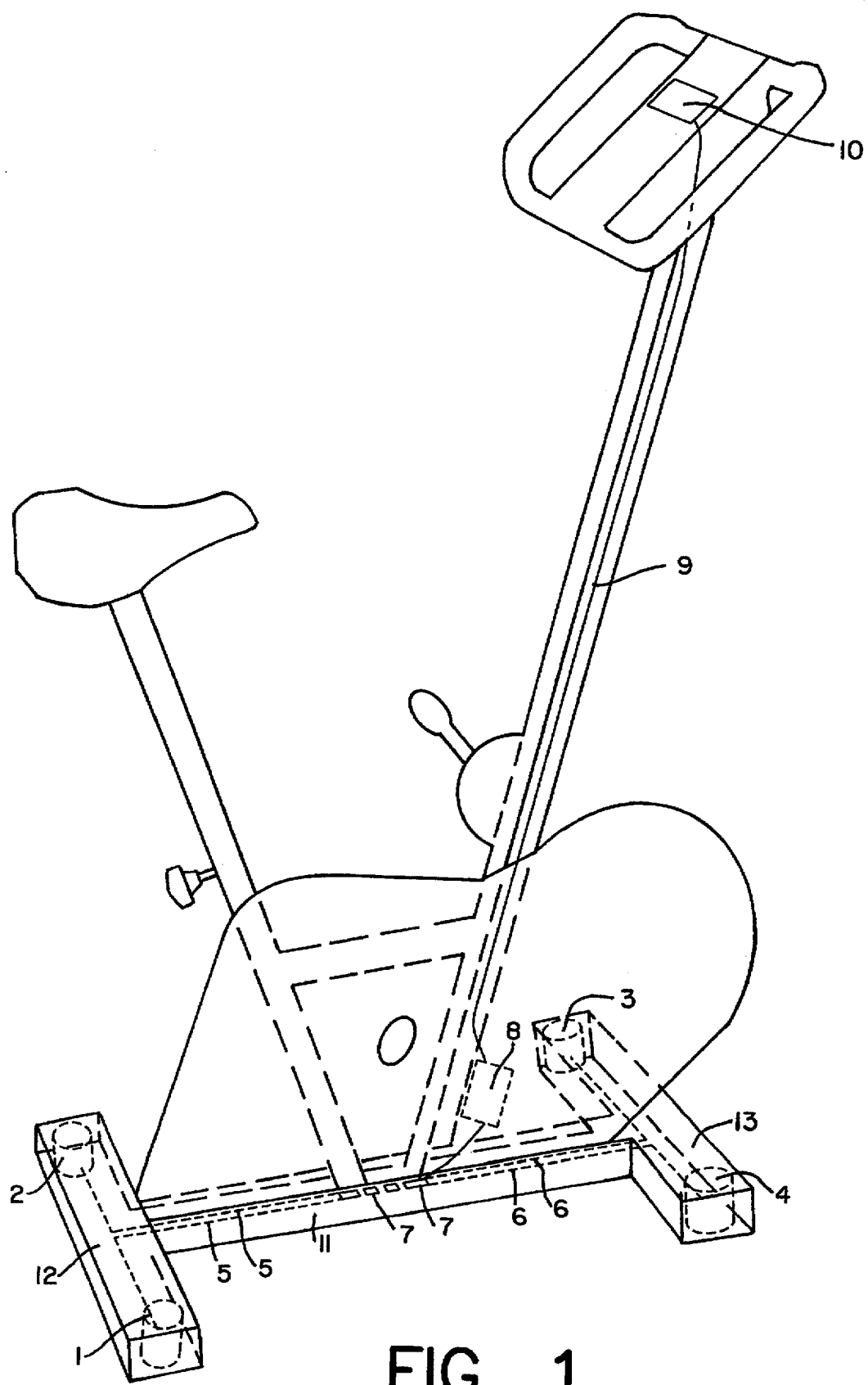
FIG. 1 shows a perspective view of an indoor exercise bike with integrated weighing cells according to the present invention.
Figure 2:
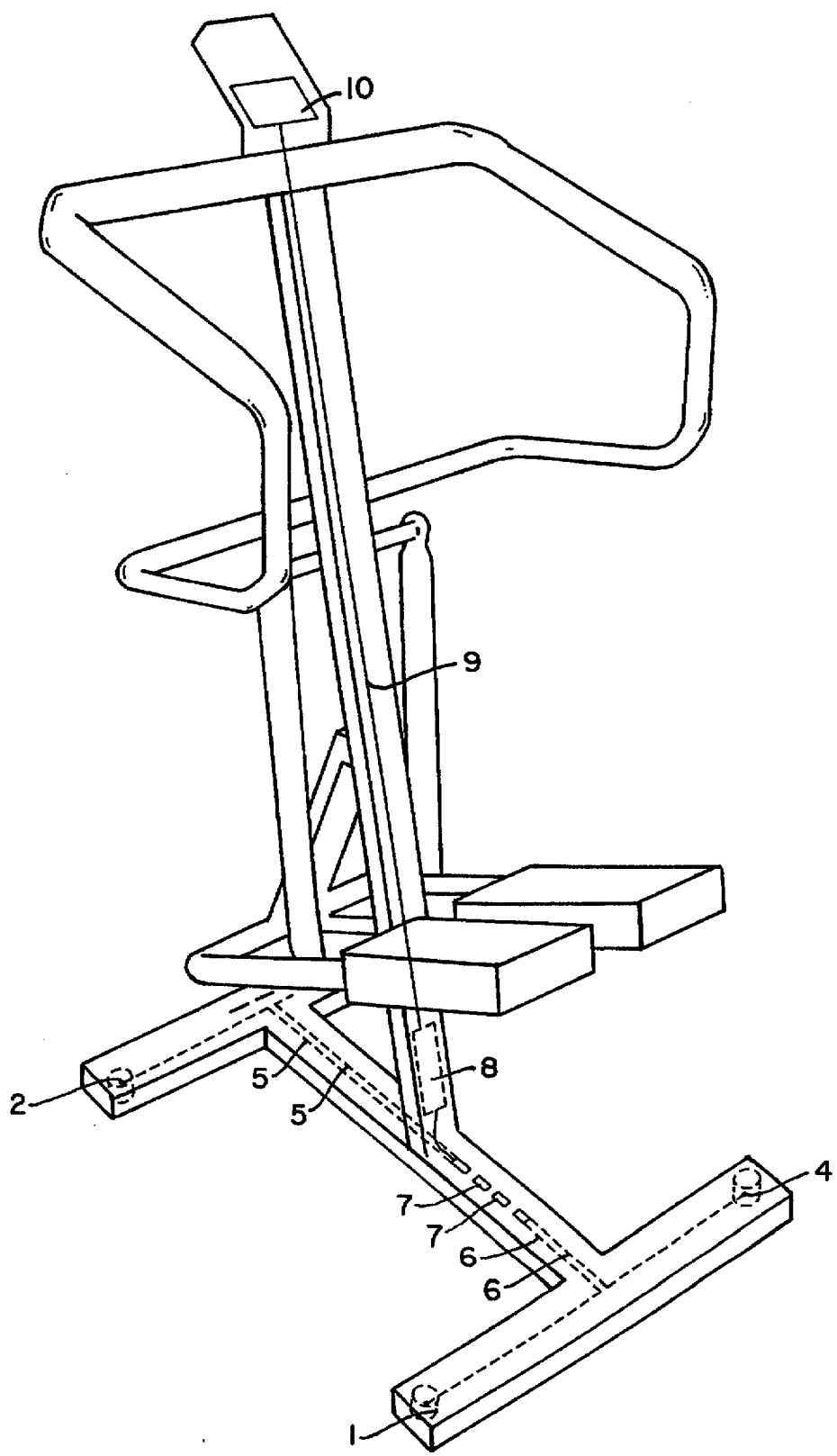
FIG. 2 shows a perspective view of a stepper with integrated weighing cells according to the present invention.
Figure 9:
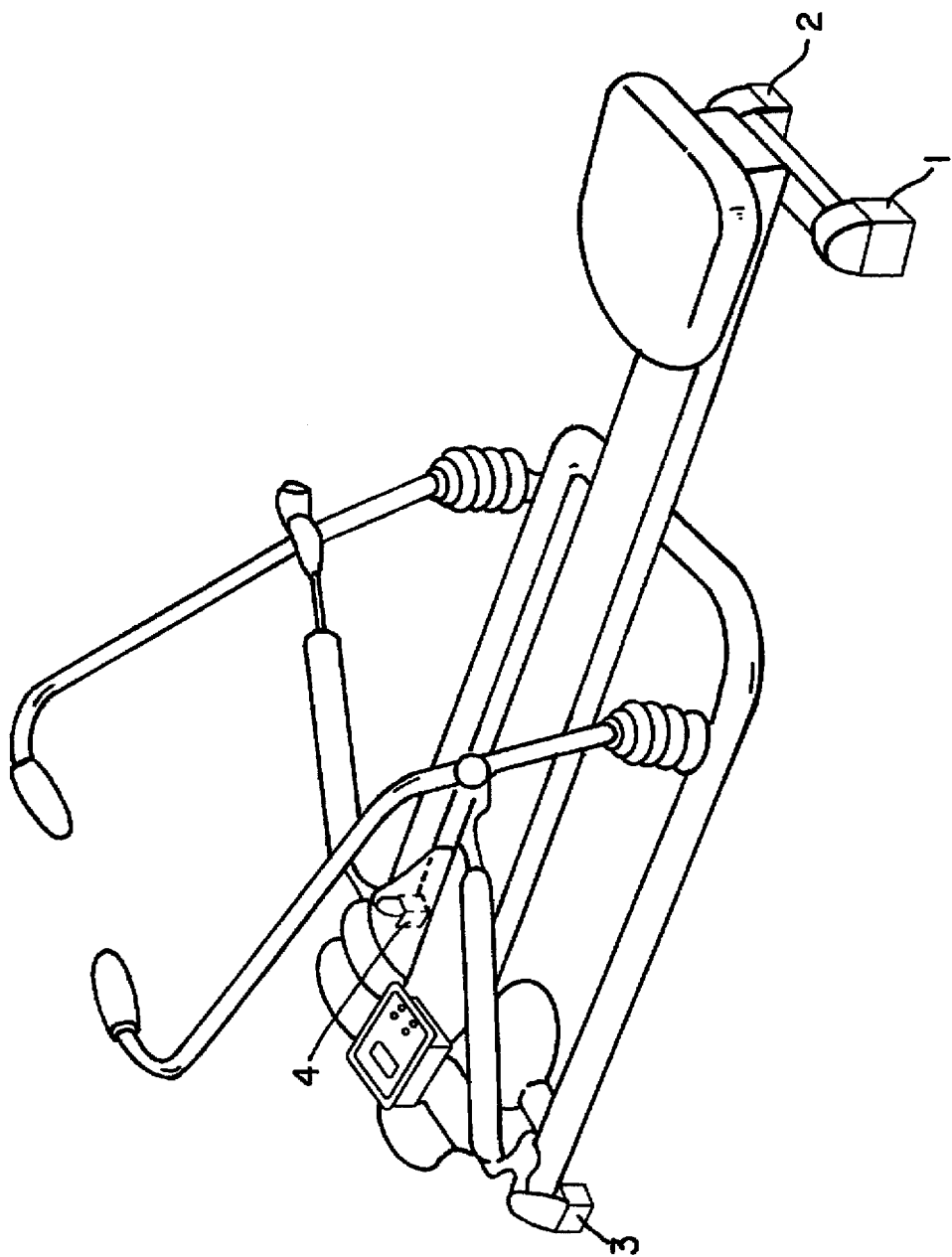
FIG. 9 shows a perspective view of a rower with integrated weighing cells according to the present invention.

FIGS. 1 and 2 show perspective views of an indoor exercise bike and a stepper, respectively. The main parts are the standing legs including a longitudinal beam 11 and two cross beams 12 and 13. Integrated in the hollow spaces in the cross beams 12 and 13 are four weighing cells 1, 2, 3 and 4, the construction of which will be explained below with reference to FIGS. 3 and 4. The weighing cells are integrated in such way to lift the cross beams 12 and 13, and consequently also the longitudinal beam 11, a little bit from the floor, which means that the total weight of the training equipment is resting on the four weighing cells. All four weighing cells are connected by cables 5 and 6 and a connector block 7 with the data interpreter 8 in which the body weight is calculated after deduction of the weight of the training equipment itself. Such weight calculated by the data interpreter 8 is fed to the display unit 10 in the handle bar area of the training equipment, for example. The training person therefore may read his or her body weight from the display unit 10 at any time. FIG. 9 likewise shows a perspective view of a rower, in which four weighing cells 1, 2, 3 and 4 are integrated into the feet of the rower.

Figure 5:
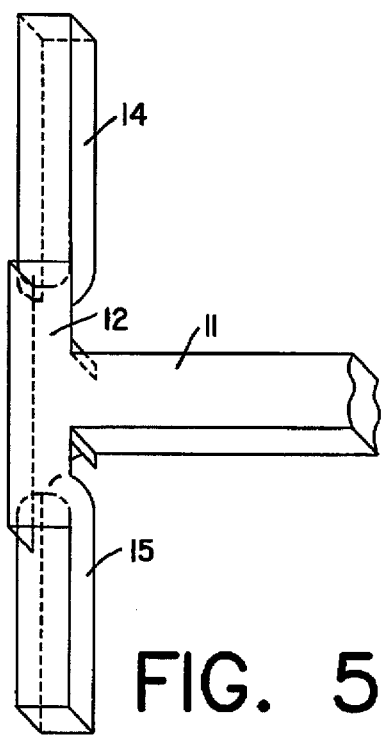
FIG. 5 shows one leg of a piece of exercise equipment with foldable end parts.

Because of the extremely small values of the electric current produced in the weighing cells, the electric cable connection is pre-installed by the factory by soldering the individual measurement cables, thus avoiding a lack of current. This factory pre-assembly, however, creates difficulties when packing such exercise equipment for shipping purposes. This is prevented by attaching the standing legs shown in FIG. 5 to turning hinges or screw bolts along an axis, thus making the end parts 14 and 15 of the cross beams 12 and 13 foldable.

Figure 3:
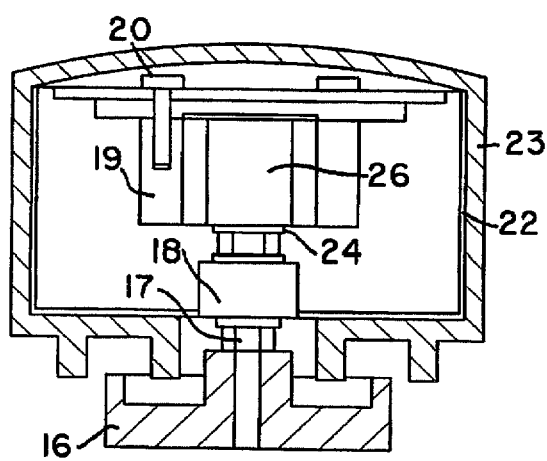
FIG. 3 shows an exemplary weighing cell according to the present invention in profile.
Figure 4:
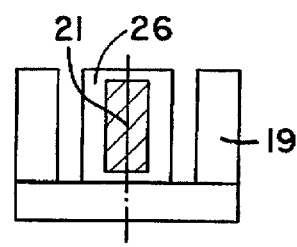
FIG. 4 shows the detailed configuration of a portion of the weighing cell shown in FIG. 3.

An exemplary embodiment of a weighing cell is shown in FIGS. 3 and 4. From the detail of FIG. 3, one can see the co-axially positioned parts 16 and 19 which are connected by a rubber cushion 18 and are spring suspended against each other. The complete part is positioned in a square tube 22 and is attached with screws 20 to the cross beams 12 and 13. Finally, a rubber type cap 23 is placed over the weighing cells.

The body of revolution 16 is connected to the rubber cushion 18 by a screw connection 17.

The square part 19 is shown in detail in FIG. 4 and is vertically positioned with respect to FIG. 3. Also shown is a center latch 26 on which a wire strain gauge 21 is positioned.

If pressure is applied to the weighing cell from the top, for example by the body weight of the training person, the pressure will be transferred to the latch 26, causing bending of the wire strain gauge 21, and creating electric potential which then will be transferred to the data interpreter 8 as described above.

Figure 7:
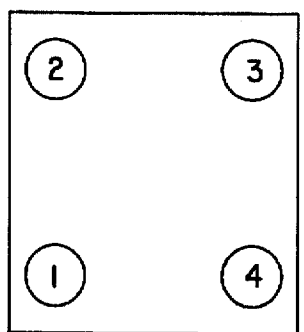
FIG. 7 illustrates the scheme for the placement of the weighing cells of FIG. 6.
Figure 6:
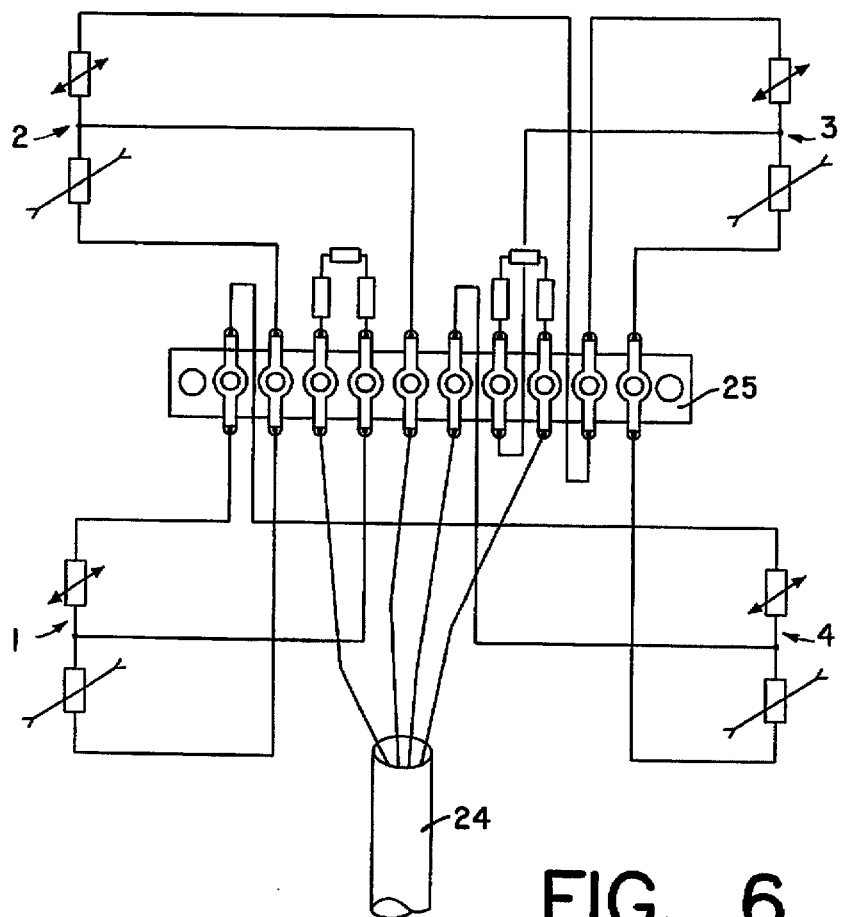
FIG. 6 is an exemplary circuit diagram of four integrated weighing cells with a connector block according to the present invention.

FIG. 6 shows a scheme for connecting the cables of the four weighing cells 1, 2, 3 and 4, including wiring of the electric circuit and transferring the electric potential produced by the wire strain gauge 21 to the data interpreter 8 via the cable 24. The scheme for the distribution of the weighing cells is again shown in FIG. 7.

It is important to note that the weighing cell shown in FIGS. 3 and 4 is exemplary only and may be replaced by a weighing cell of another type.

Figure 8:
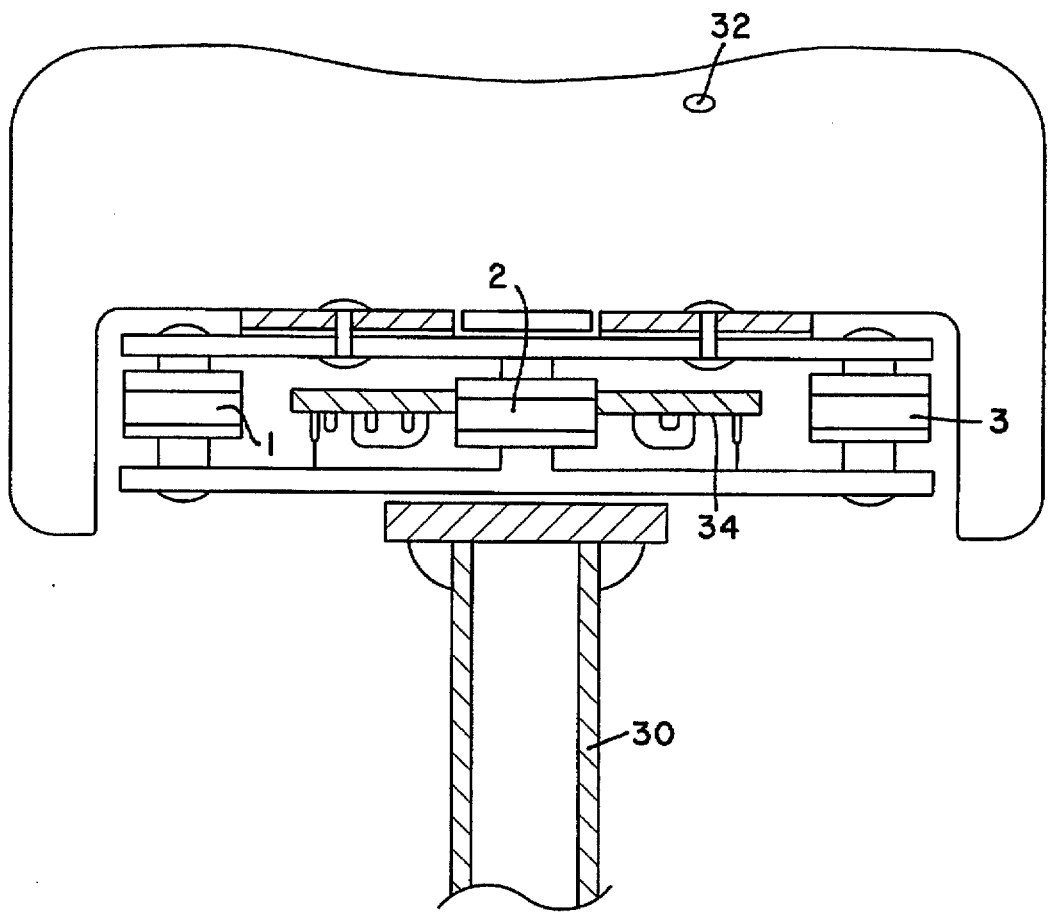
FIG. 8 is a cross-sectional view of a saddle portion of an exercise bike with integrated weighing cells according to another embodiment of the present invention.

FIG. 8 illustrates another embodiment of the present invention in which three weighing cells 1, 2 and 3 are integrated into the saddle post 30 of an indoor exercise bike, for example. In particular, the three weighing cells 1, 2 and 3 are positioned beneath the saddle 32 on which the person riding the exercise bike sits. A computer (PC) board 34 houses the data interpreting logic for determining the weight of the person as a function of the signals received from the weighing cells 1, 2 and 3, and for outputting the weight for display.

What is claimed is:

1. An apparatus comprising:
    a piece of exercise equipment, the piece of exercise equipment including at least one standing leg;
    at least three electromechanical weighing cells mounted to the at least one standing leg of the piece of exercise equipment such that an entire weight of the piece of exercise equipment rests on the at least three weighing cells, the weighing cells determining a weight applied to the weighing cells and providing an electrical signal indicative thereof;
    a signal interpreting device coupled to the weighing cells for determining a display weight as a function of the electrical signal; and
    a display device coupled to the signal interpreting device for displaying the display weight.

2. The apparatus according to claim 1, wherein the piece of exercise equipment is an indoor exercise bike.

3. The apparatus according to claim 1, wherein the at least three weighing cells are mounted in a hollow space of the at least one standing leg.

4. The apparatus according to claim 1, wherein the at least three weighing cells includes four weighing cells.

5. The apparatus according to claim 1, wherein the signal interpreting device is coupled to the weighing cells via at least one soldered cable.

6. The apparatus according to claim 1, wherein the display device displays the display weight in at least one of an analog format and a digital format.

7. The apparatus according to claim 1, wherein the piece of exercise equipment includes a saddle and a saddle post connected to the saddle.

8. The apparatus according to claim 1, wherein the at least one standing leg includes at least one cross beam having a central portion and two end portions, the central portion being connected to each of the end portions via at least one of a hinge and a bolt.

9. The apparatus according to claim 1, wherein each of the weighing cells includes first and second co-axial members and a rubber cushion being disposed between and spring-suspending the first and second co-axial members, the first co-axial member including a latch coupled to a wire strain gauge.

10. The apparatus according to claim 1, wherein the piece of exercise equipment is a stepper.

11. The apparatus according to claim 1, wherein the piece of exercise equipment is a rower.

* * * * *